UNITED STATES PATENT OFFICE.

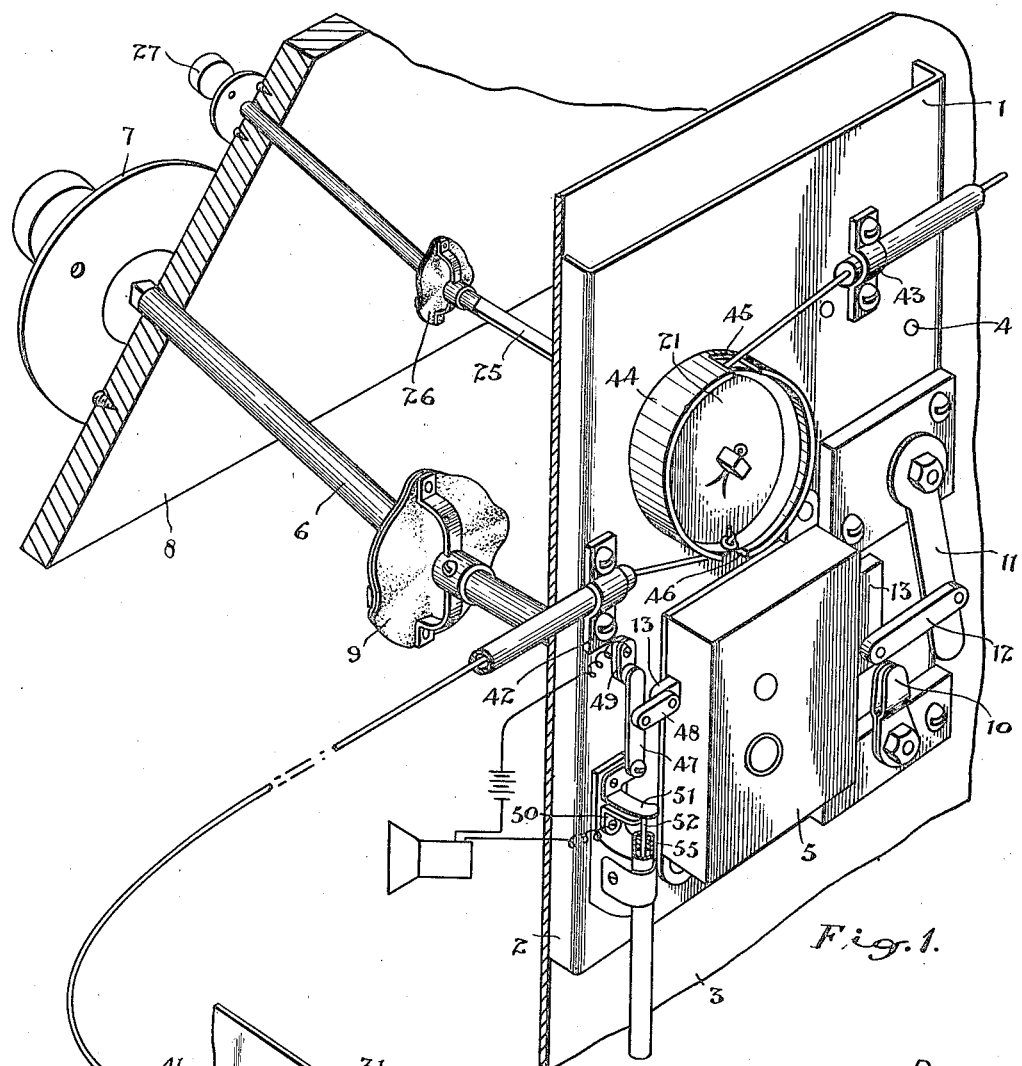
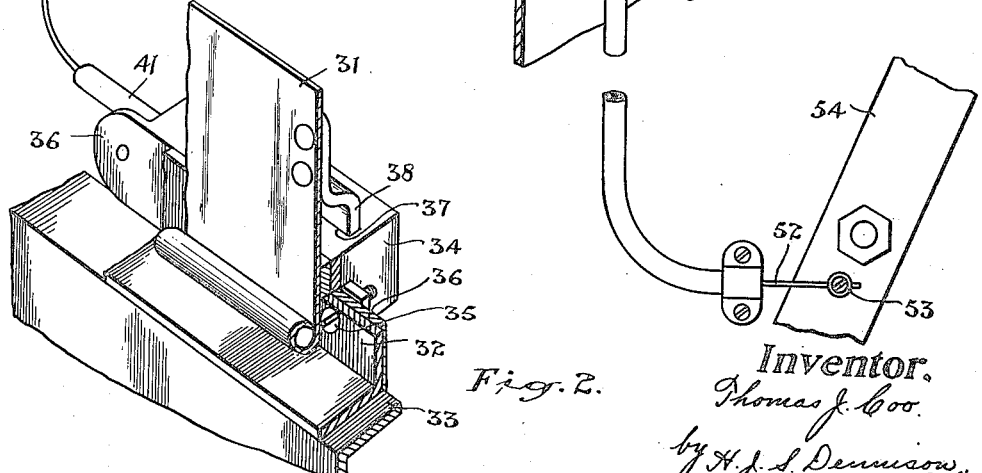

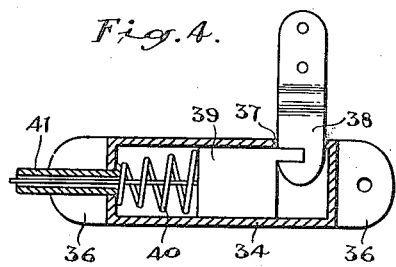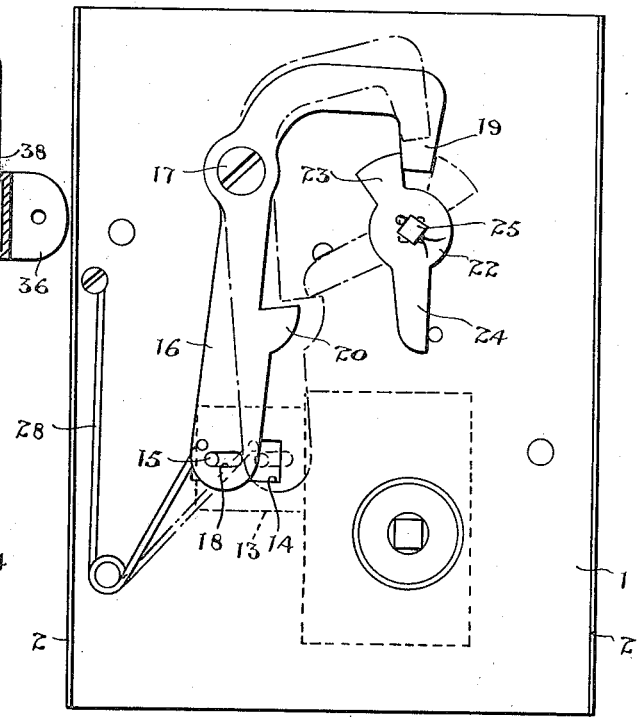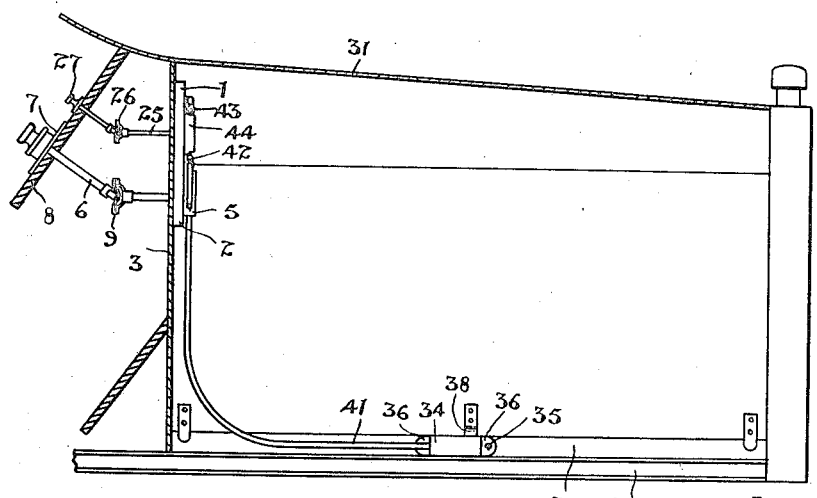

THOMAS JOHN COO, OF TORONTO, ONTARIO, CANADA.

AUTOMOBILE LOCK.

1,419,227. Specification of Letters Patent. Patented June 13, 1922.

Application filed March 15, 1920. Serial No. 365,717.

*To all whom it may concern:*

Be it known that I, THOMAS J. COO, a subject of the King of Great Britain, and resident of the city of Toronto, county of York, Province of Ontario, in the Dominion of Canada, have invented certain new and useful Improvements in an Automobile Lock, described in the following specification and illustrated in the accompanying drawings, that form part of the same.

The principal objects of this invention are to prevent unauthorized use and theft of automobiles and to devise a form of locking mechanism of such flexibility as to insure proper operation of the lock at all times.

A further object is to devise a mechanism which cannot be tampered with so as to effect its release and which is of an extremely simple nature, easily operated, not liable to get out of order and readily adapted to any make or style of car.

A still further object is to effectively prevent the towing of the car by unauthorized persons while not interfering with the legal regulations requiring the car to be movable.

The principal feature of the invention consists in the novel construction and arrangement of parts whereby locking devices are arranged within the engine enclosure in such a manner as to prevent access thereto except through the medium of a combination lock also arranged within the sealed engine enclosure and operable by means of a rod extending to an accessible position within the automobile.

A further important feature consists in the novel method of operating the several locking members in unison and in the means of controlling such operation from the combination lock whereby the locking devices may be secured in an unlocked position if desired and which will further serve as a means for determining whether any portion of the locking mechanism is not operating properly.

A still further important feature consists in a novel arrangement of a signal device in conjunction with the combination lock and the braking mechanism of the car whereby when the car is locked an audible signal is given when the brake is released.

In the drawings, Figure 1 is a perspective sectional view showing the lock controlling mechanism arranged on the inner side of the engine enclosure with the extending operating means and also showing the connection with the brake and signal device.

Figure 2 is a sectional perspective detail of a portion of the engine hood securing flange and lock.

Figure 3 is a vertical cross-sectional view through the parts shown in Figure 2 and the car frame and part of the pan.

Figure 4 is a longitudinal sectional view of the engine hood lock.

Figure 5 is an elevational view of the backside of the lock carrying plate shown in Figure 1 showing the arrangement of mechanism between said plate and the rearward bulkhead of the engine enclosure.

Figure 6 is a reduced longitudinal sectional view of the engine hood showing the location of my improved locking device.

Various forms of locking devices have been proposed which include means for fastening the engine hood to prevent access to the engine equipment but such devices, as far as I am aware, have failed in that they are not sufficiently flexible to allow for the flexibility of the car frame, and further, none of these have as far as I am aware, been of such a nature as to render them proof against expert mechanics.

This result is accomplished in the present device in a very simple manner.

All automobiles are constructed with a bulkhead separating the engine enclosure from the interior of the body of the car and it is therefore impossible for a person within the body of the car to obtain effective access to the upper portion of the front side of such bulkhead and my locking control device is therefore arranged upon the forward side of this bulkhead close up to the top. The lock controlling device is constructed in a unit, all the parts of which are mounted upon a plate 1 formed with flanged edges 2 which are adapted to engage the bulkhead 3 and space the plate therefrom.

The plate is fastened in position by rivets or bolts 4 preferably having heads countersunk in the bulkhead. If bolts are used, the nuts will be locked upon the forward side, that is under the engine hood.

Upon the forward side of the plate 1 is fastened a combination lock 5 which may be of any suitable pattern. This lock is operated by a rod 6 which extends through a hole in the bulk head 3 and has connected at its opposite end a combination dial 7 arranged upon the instrument board 8 of the automobile. The rod 6 is preferably provided with a flexible coupling 9 to enable it to operate in an angular position as will be required in most cars.

Arranged adjacent to the lock and upon the same side of the plate 1 is an electric switch contact 10 and a switch arm 11. The switch arm is connected by a pivotal insulating link 12 to the bolt 13 of the lock 5 so that as the bolt is operated the switch arm 11 will be swung to close or open the ignition circuit of the engine.

A slot 14 is cut in the plate 1 back of the bolt 13 and a pin 15 secured in said bolt extends through said slot. An arm 16 is pivotally mounted upon a screw 17 on the back side of the plate 1, said arm having a slot 18 in the lower end through which the pin 15 of the lock bolt extends. The upper end of the arm above the pivot screw extends substantially at right angles to the main portion and at its extremity is provided with a downwardly extending lug 19. A lug 20 is formed on one side of the arm 16 below the pivot.

A small pulley 21 arranged at the front side of the plate 1 above the lock 5 is rotatably journalled in an opening in the plate and an arm 22 is secured to this pulley on the back side of the plate, said arm having a segmental portion 23 extending upwardly and adapted to co-operate with the lug 19 of the arm 16 and a lower end 24 being adapted to co-operate with the lug 20.

The pulley 21 and arm 22 are operated by a squared rod 25 which extends through a hole in the plate 1 rearwardly into the car having a flexible coupling 26 and the end thereof extends through the instrument board and is provided with an operating knob 27 by means of which the rod and pulley and arm 22 are rotated.

A spring 28 is arranged upon the back of the plate 1 and engages the arm 16 to hold one end of the slot 14 in engagement with the pin 15 of the lock bolt. When the lock bolt is in the position shown in Figure 1 the arm 16 is in the position shown in full lines in Figure 5 but when the lock bolt is moved to the opposite position so that the ignition switch is closed, the spring 28 will swing the arm 16 to the position shown in dotted lines in Figure 5. When the arm is in this position the rod 25 may be rotated and the lower end 24 of the arm 22 will engage the lug 20 and swing the arm 16 on its pivot, the slot 14 allowing the arm to move in this direction freely on the pin 15. The spring 28 will, however, move the lug 20 to slip under the end of the arm 24 and lock it from being turned back.

It will be noted that when the arm 16 is in the position shown in dotted lines, the upper lug 19 is clear of the upper segmental end 23 of the arm 22 and if the lock 5 is then operated the pin 15 engaging the end of the slot 14 will swing the arm 16 on its pivot. This will move the lug 20 clear of the end 24 of the arm 22 but the upper lug 19 moves into position behind the segmental portion 23 of the arm 22 and the said arm cannot then be returned.

If for any reason the arm 22 is not rotated the full distance to lock with the lug 20 on the arm 16, then the segmental portion will be in the way of the lug 19 in its downward movement if the lock is operated, consequently the lock cannot be operated to its full extent and the engine ignition circuit will not be completed and the car cannot be started. The significance of this arrangement will be more apparent from the following description.

It is obvious that any cut-out mechanism in the ignition circuit will be of no avail if the parts are accessible. It is therefore imperative that the engine hood be locked and further that access to the engine compartment be completely barred.

The engine hood 31 extends downwardly outside of the flashing flange 32 secured to the car frame 33. A lock 34 is secured to the inner side of the flange 32 by countersunk head bolts 35. The lock casing is formed with end flanges 36 through which the bolts extend and the nuts engage the ends of the lock casing and so will not turn and as the bolts are inserted from the outer side and covered by the engine hood they cannot be tampered with.

The pan 29 which extends under the engine is shown secured to the car frame by bolts 30 but in order to lock the pan to the hood, wires 29' are secured at one end to rivets 30' in the pan and at the other end to the bolts 35 securing the locks 34 to the flashing. When the hood is locked to the flashing a completely locked envelope surrounds the engine and access cannot be had thereto till the locks are released by the legitimate means.

The lock casing 34 is here shown of a simple rectangular form having an opening 37 in the top side into which a locking tongue 38 secured to the engine hood extends, said tongue being notched.

A sliding bolt 39 is arranged within the casing 34 and is held to its locked position by a spiral spring 40. A flexible tube 41 is secured in one end of the lock casing in a sealed joint. This tube may be bent into any desirable shape and it is carried along the hood flange and up the bulkhead 3 and is rigidly secured at its upper end by a clip 42 to the plate 1 adjacent to the grooved pulley 21. Each side of the hood is provided with one of these locks and a corresponding tube is secured to the plate 1 by the clip 43.

Flexible wires are connected to the lock bolts and these pass through the tubes and the upper terminal ends are secured in the periphery of the grooved pulley 21, the points of connection of said wires being arranged diametrically opposite at the bottom and top.

A cylindrical casing 44 is secured to the plate 1 and loosely encircles the periphery of the pulley 21 to form a guide to ensure the wires remaining in the groove. The wires pass through notches 45 and 46 cut in the periphery of said casing.

It will be seen that upon the rotation of the pulley 21 by means of the rod 25, the wires will be wound upon the pulley, thus drawing upon the bolts and releasing the fastening tongues 38 so that the hood may be raised. When the bolts have been withdrawn the lock 5 may be turned and in being so turned the arm 16 will be moved to the position shown in full lines in Figure 5 with the upper lug 19 engaging the quadrant portion 23 when such quadrant is in the position shown in dotted lines in Figure 5, thus holding the hood locks in a disengaged position and locking the cover locks in an unlocked position.

This arrangement is provided so that when the car is left for repairs or for any special purpose when it is desired to allow others to operate it, it will not be necessary to disclose the combination of the lock to others and the car may be operated. Such for instance as when it is placed in the hands of repair men, it will only be necessary then for them to bridge the ignition circuit by a piece of wire in order to operate the car.

In ordinary use, when the car is in operation the combination lock is turned to close the ignition circuit and the spring 28 swings the arm 16 to the dotted position shown in Figure 5. This allows the hood locks to be operated if required in the manner described by turning the rod 25 when the lug 20 will engage the lower end 24 of the arm 22 until the rod is turned back.

The combination lock is used to cut out the ignition to stop the engine and in operating the combination lock the pin 15 swings the arm 16 on its pivot back to the position shown in full lines in Figure 5. In so doing, the lug 20 releases the arm 22 and the springs of the cover locks rotate the pulley 21 with a quick motion that moves the quadrant portion 23 back to its initial position before the lug 19 resumes its normal position. If by any chance either one of the cover locks should get out of order, the pull of the spring of one lock will not be sufficient to bring the arm 22 back to its original position and the quadrant member will interfere with the movement of the arm 16 and consequently it will interfere with the operation of the combination lock and the operator will thus be notified that the device is out of order. If, however, the cover locks operate properly the lug 19 engages the quadrant as shown in full lines in Figure 5 and prevents the release of the cover locks.

With an apparatus such as described installed in a car, it will be seen that the flexible connections between the cover locks and the combination lock will not be affected by any distortion of the car frame, such as one of the wheels resting in a hole or of the car standing on a slanting road and the cover will always be locked down and as the pan is locked from the inside it cannot be removed. Further, if by any possible chance a hole is cut either in the pan or in the hood and access to the flexible connections is had, the cutting of the tube with pincers will not give access to the wire as the tube will be closed in to cover the end of the wire. It is therefore practically impossible for a person to get into the interior of the engine compartment when such a device is used without destroying the hood.

It will be readily understood that locks similar to the hood locks may be applied to any other parts of the vehicle and with the flexible connections such locking means may be operated at any place such as a rear wheel, the gears or the clutch, or it may be used for securing spare rims in place.

The laws mostly provide that cars must be left so that they can be moved in the event of fires or such other reasons, consequently it is possible for a car to be towed away. In order to provide against this form of theft an electric switch 47 is connected by an insulating link 48 to the bolt 13 of the combination lock in such a manner as to be closed when the switch 11 is open and vice versa. The terminal 49 is connected with a battery and signal horn circuit and this circuit is completed to the switch arm 47 through a pair of contact fingers 50 and 51. The contact 51 is a spring finger normally engaging the contact 50 and the circuit is closed when the switch 47 is closed. It would not be desirable to retain this signal circuit closed when the car is locked but when a car is locked the brake is applied and as long as the brake is applied the car cannot be moved. A connection between the signal circuit and brake must therefore be established and this is accomplished by arranging a tube enclosed wire 52 so that the upper end will, when the brake is applied, engage the spring finger 51 and move it out of contact with the contact 50. The lower end of the wire 52 is connected by a suitable swivel 53 to the emergency brake lever 54 so that as the lever is operated it opens or closes the signal circuit contacts 50 and 51.

The wire and tube connection is such that it is proof against being tampered with.
The contact operating end is within the sealed engine enclosure on the plate 1 and the end of the wire passes through a small hole in the centre of a disc 55 closing the top end of the tube. If the lower end of the wire is cut it will drop through the hole in the disc 55 and it cannot be put back from the bottom end and when this wire is moved down from the position it should assume when the brake is applied, either by releasing the brake or tampering, the contacts 50 and 51 engage and if the car is locked the horn will sound continuously which will of course effectively prevent the car being towed away.

The device is extremely simple and is of such a nature that it can be readily applied to any style of car without changing the structure of the car and the whole device can be manufactured and installed at very reasonable cost.

What I claim as my invention is:—

1. An automobile lock, comprising, a plurality of locking members arranged within the engine enclosure, flexible wire controls connected with each of said locking members, a manually operable rotatable member connected to the inner ends of said flexible wire controls and adapted upon being rotated to pull upon said wires and unlock said locking members, and a combination lock adapted to lock said manually operable member.

2. An automobile lock, comprising, a plurality of locking members arranged within the engine enclosure, flexible wire controls connected with each of said locking members, a manually operable rotatable member connected to the inner ends of said flexible wire controls and adapted upon being rotated to pull upon said wires and unlock said locking members, an arm rigidly connected with said rotatable member, a latch adapted to engage said arm and lock the rotatable member, and a combination lock adapted to operate said latch.

3. An automobile lock, comprising, a plurality of locks adapted to lock the engine hood closed, flexible wires connected with said locks, a plate mounted within the engine enclosure, a pulley journalled in said plate and having the inner ends of said wires connected to the periphery thereof, an arm secured to the spindle of said pulley and formed with a quadrant-shaped upper end, a latch arm of substantially right angular form pivoted adjacent to the aforesaid arm and having a lug on the upper extremity adapted to co-operate with the quadrant-shaped end of the aforesaid arm, said latch arm having a lug on its lower extremity adapted to co-operate with the lower end of the aforesaid arm, a combination lock supported upon said plate and having its bolt operatively connected with said latch arm and adapted when locked to hold said latch arm in contact with the rotatable arm connected with the pulley to prevent the rotation of the pulley and the operation of the hood locks, and a rod extending from said combination lock outwardly beyond the engine compartment.

4. An automobile lock, comprising, a plurality of locks adapted to lock the engine hood closed, longitudinally slidable flexible wires connected with said locks, a plate having edge flanges rigidly secured on the inner side of the engine compartment, a combination lock secured upon the inner side of said plate, a rotatable member arranged upon the inner side of said plate and connected to the inward ends of the wires operating the hood locks, a rod secured to said rotatable member and extending through said plate and beyond the engine compartment, an arm secured to said rotatable member, said arm having a quadrant-shaped upper end, a substantially right angular shaped latch arm pivotally mounted on the plate at its angle having the upper end extending over the rotatable arm and formed with a downwardly extending lug adapted to engage the quadrantal portion of the aforesaid arm, the downwardly extending portion of said pivotal latch arm having a lug adapted to engage the lower end of the rotatable arm and to hold same in its rotated position, a slot in the lower end of said latch arm, a pin secured to the bolt of the combination lock extending through a slot in the plate upon which it is supported and into the slot in said latch arm, a spring engaging said latch arm and holding it against the pin, and springs operating the hood cover locks to their closed positions.

5. An automobile lock, comprising, latch bolts arranged within closed casings on the inward side of the frame of the car having fastening bolts extending through the upright flanges of the edge of the engine compartment, said bolts being adapted to be covered by the engine hood, locking tongues secured to the engine hood adapted to enter said latch bolt casings and engaging said latch bolts, springs operating said latch bolts to engage said tongues, flexible tube enclosed wires connected with said latch bolts and extending toward a common position in the engine compartment, means connected to said wires for drawing upon them in unison, means for locking said operating means, and a combination lock arranged within the engine enclosure and controlling the aforesaid locking means.

6. In an automobile lock the combination with the engine hood and pan, hood locks secured within the engine compartment having their fastening bolts covered by the engine hood when closed, means for fastening the pan secured on the inner side and fastened to the frame beneath the hood, means for manipulating the hood locks, and a combination lock controlling said manipulating means.

THOMAS JOHN COO.